United States Patent
Han et al.

(10) Patent No.: US 11,456,479 B2
(45) Date of Patent: Sep. 27, 2022

(54) BATTERY WITH IMPROVED SAFETY

(71) Applicant: DONGGUAN POWERAMP TECHNOLOGY LIMITED, Dongguan (CN)

(72) Inventors: Xiang-Long Han, Ningde (CN); Tao Tao, Ningde (CN)

(73) Assignee: DONGGUAN POWERAMP TECHNOLOGY LIMITED, Dongguan (CN)

( * ) Notice: Subject to any disclaimer, the term of this patent is extended or adjusted under 35 U.S.C. 154(b) by 379 days.

(21) Appl. No.: 16/519,240

(22) Filed: Jul. 23, 2019

(65) Prior Publication Data
US 2020/0313222 A1 Oct. 1, 2020

(30) Foreign Application Priority Data
Mar. 25, 2019 (CN) .......................... 201920380894.X

(51) Int. Cl.
*H01M 10/04* (2006.01)
*H01M 4/02* (2006.01)
*H01M 10/0587* (2010.01)

(52) U.S. Cl.
CPC .... *H01M 10/0431* (2013.01); *H01M 10/0587* (2013.01); *H01M 2004/027* (2013.01); *H01M 2004/028* (2013.01)

(58) Field of Classification Search
None
See application file for complete search history.

(56) References Cited

U.S. PATENT DOCUMENTS

2012/0202105 A1* 8/2012 Shinyashiki ........ H01M 10/052
429/153

FOREIGN PATENT DOCUMENTS

| CN | 205828550 U | 12/2016 |
|---|---|---|
| CN | 207781748 U | 8/2018 |

* cited by examiner

*Primary Examiner* — Carmen V Lyles-Irving
(74) *Attorney, Agent, or Firm* — Maier & Maier, PLLC

(57) ABSTRACT

A battery proofed against short circuiting, for better safety, includes a battery cell and a first set of electrode tabs. The battery cell includes a first electrode plate and a second electrode plate. The first set of electrode tabs is electrically connected to the first electrode plate. The first set of electrode tabs includes a first bending portion, an edge of the second electrode plate defines a first receiving groove, and the first receiving groove corresponds to the first bending portion.

18 Claims, 5 Drawing Sheets

BATTERY WITH IMPROVED SAFETY

FIELD

The subject matter herein generally relates to batteries, and more particularly, to a battery with improved safety.

BACKGROUND

Lithium batteries have become ideal energy source for instruments and meters, as well as the preferred power sources for automotive electronics, because of a high operating voltage, high energy density, low self-discharge, and long service life.

The lithium battery may use metallic foil (for example, copper foil, aluminum foil, or nickel foil) as a current collector. Electrode tabs may be connected to the current collector by soldering for electron conducting. In order to improve the energy density of the electrode tabs and reduce the space occupied by the electrode tabs, the electrode tabs need to be bent. However, this may lead to contact between the bent portion of the electrode tabs and the electrode plate, and a short circuit may happen which decreases the safety of the lithium battery. Therefore, there is room for improvement in the art.

SUMMARY

What is needed, is a battery which can avoid short circuits.

The present disclosure provides a battery with improved safety including a battery cell and a first set of electrode tabs. The battery cell includes a first electrode plate and a second electrode plate. The first set of electrode tabs is electrically connected to the first electrode plate. The first set of electrode tabs includes a first bending portion, an edge of the second electrode plate defines a first receiving groove, and the first receiving groove corresponds to the first bending portion.

In one embodiment, the first electrode plate defines a second receiving groove, and the second receiving groove corresponds to the first bending portion.

In one embodiment, the first electrode plate and the second electrode plate are wound the form the battery cell, and the battery cell includes a first cell portion and a second cell portion facing the first cell portion, the first set of electrode tabs is disposed at the first cell portion, and the first receiving groove and the second receiving groove face each other, and are disposed at the second cell portion.

In one embodiment, the first set of electrode tabs includes a plurality of first electrode tabs and at least one second electrode tab, the plurality of first electrode tabs overlaps each other in the battery cell, a width of the second electrode tab is greater than a width of each of the plurality of first electrode tabs, and the second electrode tab is disposed at an inner side and/or an outer side of the battery cell, and the second electrode tab bends to clad the plurality of first electrode tabs to cooperatively form the first bending portion.

In one embodiment, a connecting area is disposed between the second electrode tab and the first electrode plate, and an arc or a polygonal transition is provided at a junction of the connecting area and the first electrode plate.

In one embodiment, the plurality of first electrode tabs and the second electrode tab are integrally formed with the first electrode plate.

In one embodiment, the battery cell further includes an isolation film disposed between the first electrode plate and the second electrode plate, and the isolation film includes a blocking area, and the blocking area is disposed at an edge of the isolation film, and corresponds to the first receiving groove and the second receiving groove.

In one embodiment, a width of each of the first receiving groove and the second receiving groove is greater than a maximum width of the first bending portion.

In one embodiment, a depth of each of the first receiving groove and the second receiving groove is greater than a total length of the first bending portion.

In one embodiment, the battery further includes a second set of electrode tabs electrically connected to the second electrode plate, wherein the second set of electrode tabs includes a second bending portion, and the first electrode plate further defines a third receiving groove, and the third receiving groove corresponds to the second bending portion.

In one embodiment, the second electrode plate further defines a fourth receiving groove, and the fourth receiving groove corresponds to the second bending portion.

In one embodiment, the second electrode plate further defines a fifth receiving groove, and the first electrode plate further defines a sixth receiving groove, and the fifth receiving groove and the sixth receiving groove correspond to the first bending portion.

In one embodiment, the first electrode plate further defines a seventh receiving groove, and the second electrode plate further defines an eighth receiving groove, and the seventh receiving groove and the eighth receiving groove correspond to the second bending portion In one embodiment, the second set of electrode tabs comprises a plurality of first electrode tabs and at least one second electrode tab, the plurality of first electrode tabs overlaps each other in the battery cell, a width of the second electrode tab is greater than a width of each of the plurality of first electrode tabs, and the second electrode tab is disposed at an inner side and/or an outer side of the battery cell, and the second electrode tab bends to clad the plurality of first electrode tabs to cooperatively form the second bending portion.

In one embodiment, a connecting area is disposed between the second electrode tab and the first electrode plate, and an arc or a polygonal transition is provided at a junction of the connecting area and the first electrode plate.

In one embodiment, the plurality of first electrode tabs and the second electrode tab are integrally formed with the second electrode plate.

In one embodiment, the second bending portion is U-shaped.

In one embodiment, a depth of each of the first receiving groove and the second receiving groove is greater than a total length of the first bending portion.

In one embodiment, an arc or a polygonal transition is provided at each corner of the first receiving groove and the second receiving groove.

In one embodiment, the first bending portion is U-shaped.

By defining the receiving groove at the electrode plate, the bending portion does not contact the electrode plate even when the bending portion moves. Thus, short circuits can be avoided, which improves safety of the battery.

BRIEF DESCRIPTION OF THE DRAWINGS

Implementations of the present disclosure will now be described, by way of embodiments, with reference to the attached figures.

DETAILED DESCRIPTION

Figure 1:
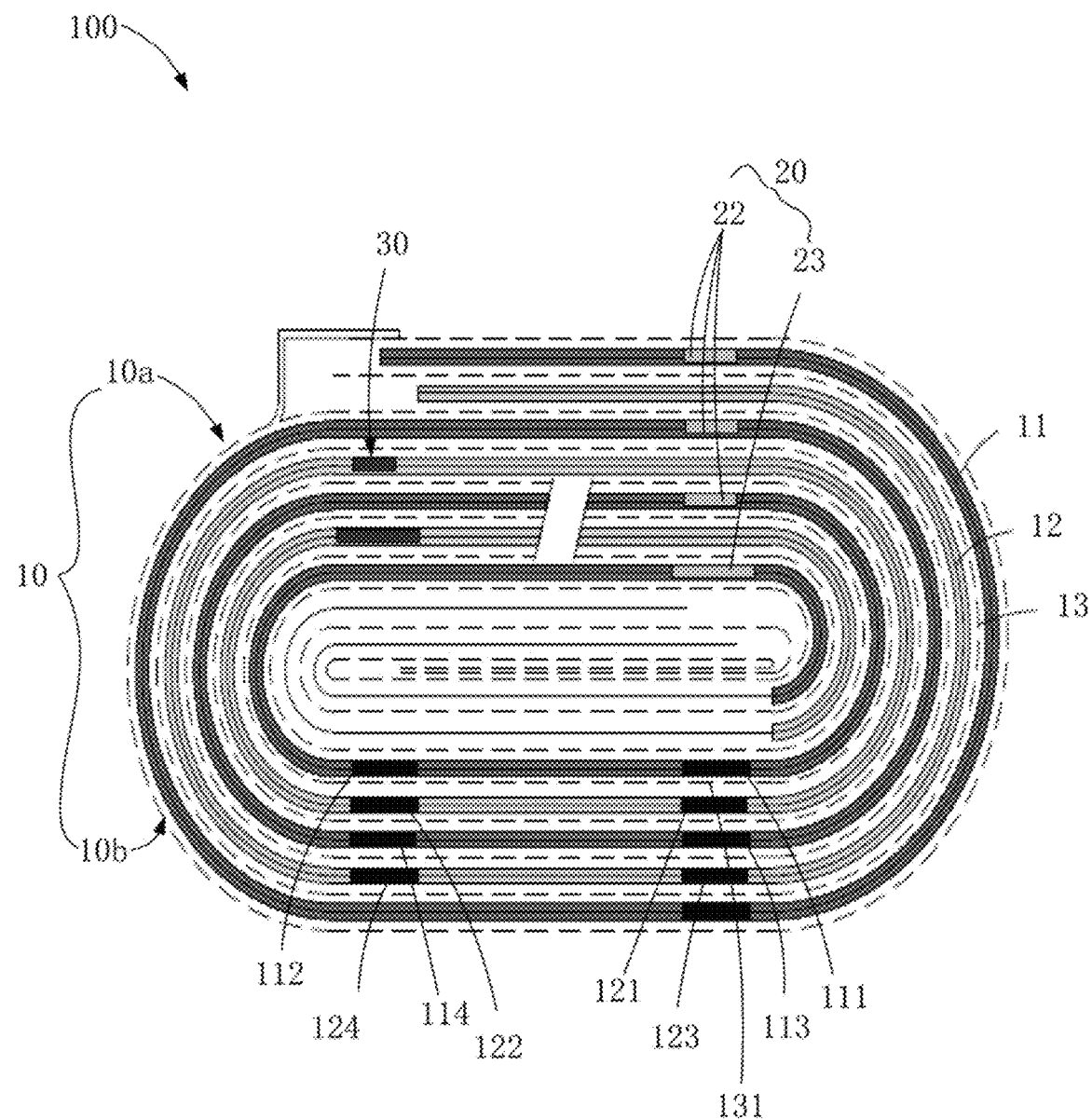
FIG. 1 is a vertical diagrammatic view of an embodiment of a battery.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

Figure 2:
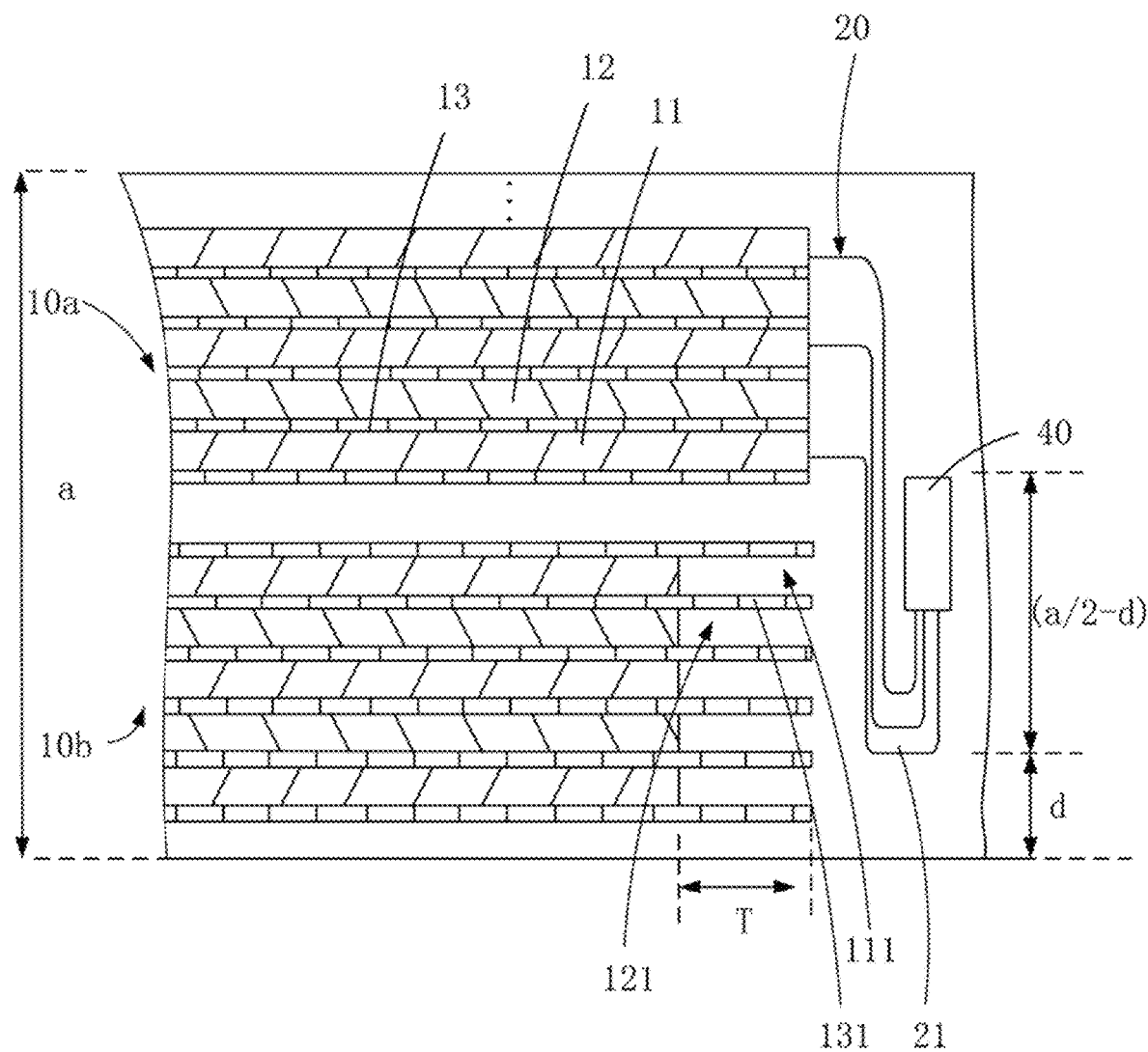
FIG. 2 is a cross-sectional view of the battery of FIG. 1.
Figure 3:
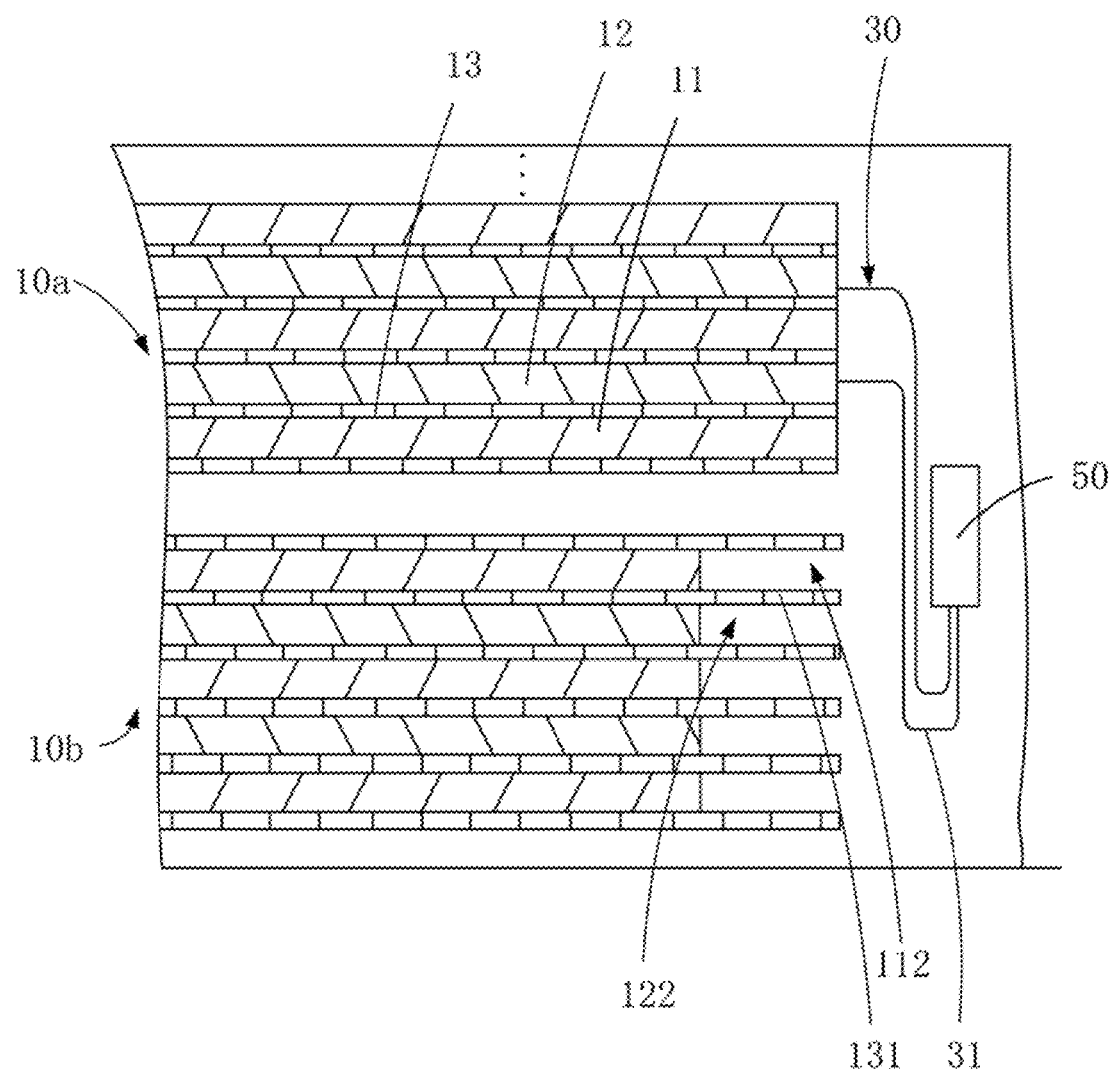
FIG. 3 is similar to FIG. 1, but showing another cross section of the battery.

FIGS. 1 to 3 illustrate an embodiment of a battery 100. The battery 100 includes a battery cell 10 and a first set of electrode tabs 20. The battery cell 10 includes a first electrode plate 11 and a second electrode plate 12. The first set of electrode tabs 20 is electrically connected to the first electrode plate 11. The first set of electrode tabs 20 includes a first bending portion 21. An edge of the second electrode plate 12 defines a first receiving groove 121. The first receiving groove 121 corresponds to the first bending portion 21. The term "corresponds to" means two objects corresponding to each other positionally. The two objects are normally spaced from each other but are close together and can engage with each other when misused. For example, the first receiving groove 121 and the first bending portion 21 correspond to each other positionally. The first receiving groove 121 and the first bending portion 21 are spaced from each other when the battery 100 is normally working, but the first receiving groove 121 can also be inserted into the first receiving groove 121 if the battery 100 is misused.

Referring to FIG. 2, the first bending portion 21 is U-shaped. In other embodiments, the shape of the first bending portion 21 can also be varied as needed.

By defining the first receiving groove 121 at the second electrode plate 12, the first bending portion 21 does not get into contact with the second electrode plate 12 even when the first bending portion 21 moves (for example, due to external impact or vibration). Thus, short circuits can be avoided.

In at least one embodiment, an edge of the first electrode plate 11 defines a second receiving groove 111. The second receiving groove 111 corresponds to the first bending portion 21. By defining the second receiving groove 111 at the first electrode plate 11, the first bending portion 21 does not get into contact with the second electrode plate 12 even when the first bending portion 21 moves.

In at least one embodiment, the battery cell 10 further includes an isolation film 13. The isolation film 13 is disposed between the first electrode plate 11 and the second electrode plate 12. The isolation film 13 includes a blocking area 131. The blocking area 131 is disposed at an edge of the isolation film 13, and corresponds to the first receiving groove 121 and the second receiving groove 111. Thus, the first bending portion 21 can get into contact with the blocking area 131 when the first bending portion 21 moves, thereby the blocking area 131 isolates the first bending portion 21 from the first electrode plate 11 and the second electrode plate 12.

In another embodiment, the depth of each of the first receiving groove 121 and the second receiving groove 111 is greater than a total length of the first bending portion 21, thereby preventing the first bending portion 21 from contacting the bottom surfaces of the first receiving groove 121 and the second receiving groove 111. Referring to FIG. 2, the thickness of the battery cell 10 is denoted as "a" and a distance between the first bending portion 21 and the packing foil of the battery 100 is denoted as "d". The total length of the first bending portion 21 is then equal to "a/2−d". Thus, the first bending portion 21 is prevented from contacting the bottom surfaces of the first receiving groove 121 and the second receiving groove 111 when the depth T of the first receiving groove 121 and the second receiving groove 111 satisfies the function T>(a/2−d). Furthermore, to prevent the first bending portion 21 from contacting the sidewalls of the first receiving groove 121 and the second receiving groove 111 when the first bending portion 21 moves, the width of each of the first receiving groove 121 and the second receiving groove 111 can be greater than the maximum width of the first bending portion 21.

In at least one embodiment, the battery cell 10 is a wound-type battery cell. That is, the first electrode plate 11, the isolation film 13, and the second electrode plate 12 are wound in place to form the battery cell 10. The battery cell 10 includes a first cell portion 10a and a second cell portion 10b facing the first cell portion 10a. The first cell portion 10a and the second cell portion 10b can be symmetrical with respect to a medial surface of the battery cell 10. The first set of electrode tabs 20 is disposed at the first cell portion 10a. The first receiving groove 121 and the second receiving groove 111 face each other, and are disposed at the second cell portion 10b. In other embodiments, the battery cell 10 can also be a layered-type battery cell formed by stacking in an order of the first electrode plate 11, the isolation film 13, and the second electrode plate 12 in that order and repeating the stacking in the order.

Figure 4:
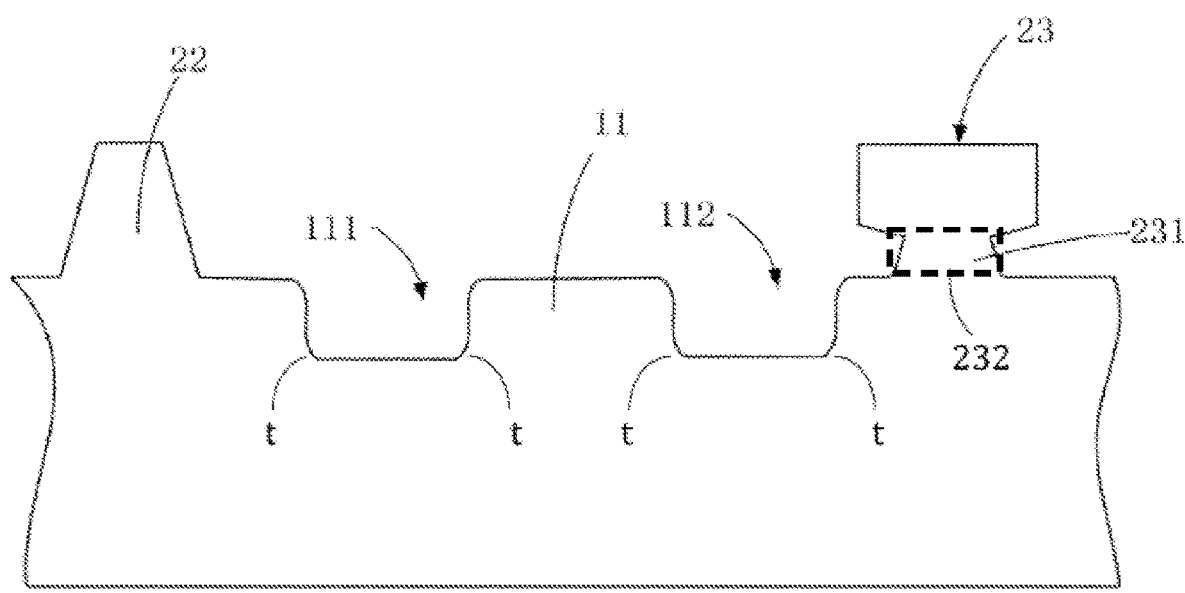
FIG. 4 is a diagrammatic view of an unfolded first electrode plate included in the battery of FIG. 1.

Furthermore, the first set of electrode tabs 20 includes a number of first electrode tabs 22. The first electrode tabs 22 overlap each other in the battery cell 10. Referring to FIG. 4, the first electrode tabs 22 can be square, trapezoidal, or rectangular. The first set of electrode tabs 20 further includes at least one second electrode tab 23. The width of the second electrode tab 23 is greater than the width of the first electrode tabs 22. When the first electrode plate 11, the isolation film 13, and the second electrode plate 12 are wound in a preset direction to form the battery cell 10, the second electrode tab 23 is disposed at the inner side and/or the outer side of the battery cell 10. The second electrode tab 23, which can function as a first-bent or a last-bent electrode tab, can be bent to clad the first electrode tabs 22. After the second electrode tab 23 is bent to clad the first electrode tabs 22, the second electrode tab 23 and the first electrode tabs 22 cooperatively form the first bending portion 21. The first electrode tabs 22 and the second electrode tab 23 can be integrally formed with the first electrode plate 11. That is, the first electrode tabs 22 and the second electrode tab 23 can be formed by a direct extension from the first electrode plate 11.

In manufacture, the battery cell 10 is further filled with electrolyte, and then encapsulated and formatted to obtain the battery 100. By the first electrode tabs 22 being clad by the second electrode tab 23, when the first electrode tabs 22 are bent to form the first bending portion 21, the second electrode tab 23 also cover burrs generated at the first bending portion 21. Such burrs are thus prevented from piercing or corroding the packing foil of the battery 100.

In at least one embodiment, a connecting area 231 is disposed between the second electrode tab 23 and the first electrode plate 11. The height of the connecting area 231 can be designed to prevent the burrs generated at the bottom portion of the second electrode tab 23 from contacting the first electrode plate 11. To avoid accumulation of stress at the second electrode tab 23, an arc (not shown) or a polygonal 232 transition is provided at the junction of the connecting area 231 and the first electrode plate 11. Furthermore, to avoid accumulation of stress at the second receiving groove 111 and the first receiving groove 121, an arc t or a polygonal (not shown) transition is provided at each corner of the second receiving groove 111 and the first receiving groove 121.

In at least one embodiment, the battery 100 further includes a second set of electrode tabs 30. The second set of electrode tabs 30 is electrically connected to the second electrode plate 12. Referring to FIG. 3, the second set of electrode tabs 30 includes a second bending portion 31. The first electrode plate 11 further defines a third receiving groove 112. The third receiving groove 112 corresponds to the second bending portion 31.

The second electrode plate 12 further defines a fourth receiving groove 122. The fourth receiving groove 122 corresponds to the second bending portion 31.

Furthermore, the second electrode plate 12 can also define a fifth receiving groove 123. The first electrode plate 11 can also define a sixth receiving groove 113. The fifth receiving groove 123 and the sixth receiving groove 113 correspond to the first bending portion 21.

Figure 5:
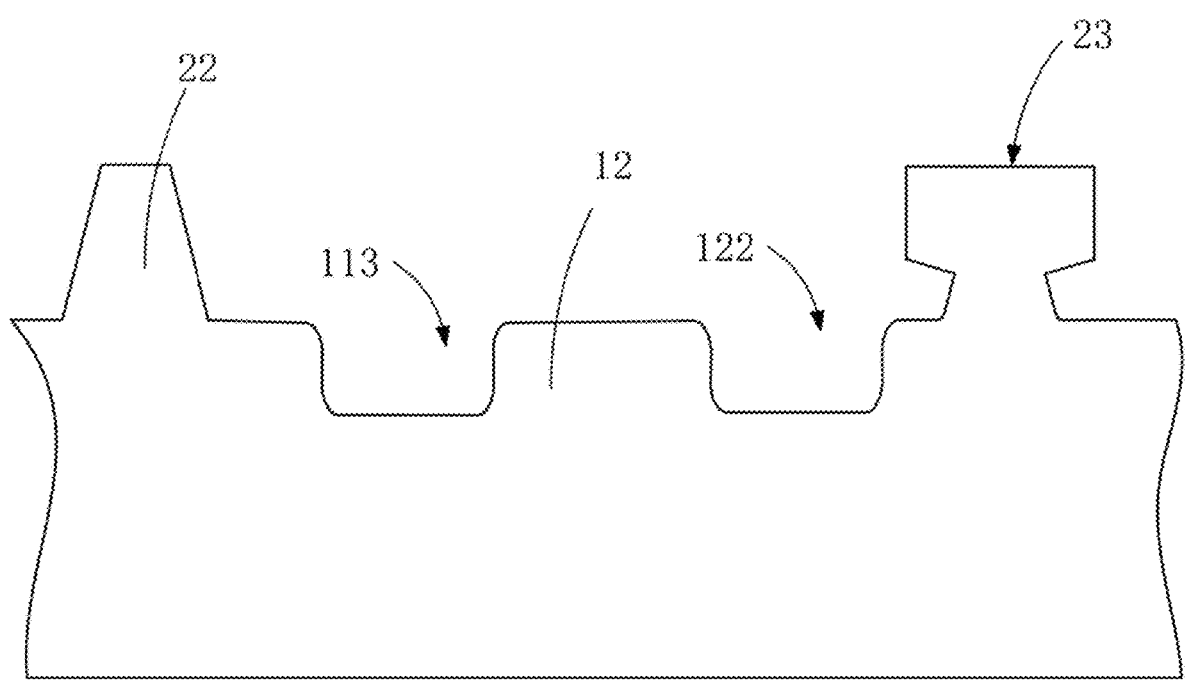
FIG. 5 is a diagrammatic view of an unfolded second electrode plate included in the battery of FIG. 1.

Furthermore, the first electrode plate 11 can also define a seventh receiving groove 114. The second electrode plate 12 can also define an eighth receiving groove 124. The seventh receiving groove 114 and the eighth receiving groove 124 correspond to the second bending portion 31. Referring to FIG. 5, the second set of electrode tabs 30 can also include a number of first electrode plates 22 and a second electrode tab 23. The second set of electrode tabs 30 has same structure as that of the first set of electrode tabs 20. The third to the eighth receiving grooves 112-124 are disposed at the second cell portion 10*b*, and have same structure as that of the first receiving groove 121 and/or the second receiving groove 111.

Referring to FIGS. 2 and 3, the first bending portion 21 of the first set of electrode tabs 20 is connected to a set of external electrode tabs (not shown) by soldering, and the soldering region thereof forms a first interconnecting portion 40. The second bending portion 23 of the second set of electrode tabs 30 is connected to another set of external electrode tabs (not shown) by soldering, and the soldering region thereof forms a second interconnecting portion 50.

Embodiment 1

Positive electrode plate and negative electrode plate preparation: a receiving groove, with a width of 39 mm and a height of 4.5 mm, was defined at the edge of the electrode plate. The electrode plate had a number of first electrode tabs and a second electrode tab. Each first electrode tabs was trapezoidal. The width of the top portion of the first electrode tab was 32 mm, the width of the bottom portion of the first electrode tab was 35 mm, and the height of the first electrode tab was 20 mm (that is, the receiving groove is wider than the widest portion of the first electrode tabs by 4 mm). A connecting area was disposed between the second electrode tab and the electrode plate. The width of the bottom portion of the connecting area was 35 mm (the same of the width of the bottom portion of the first electrode tab), and the height of the connecting area was 3 mm. The second electrode tab was rectangular, the width of the second electrode tab was 70 mm, and the height of the second electrode tab was 17 mm. Arc transitions were provided at the corners of the receiving groove and the junction of the second electrode tab and the connecting area.

Lithium battery preparation: the positive electrode plate, a separator (the separator had a blocking area corresponding to the receiving groove), and the negative electrode plate were wound to form a battery cell. The thickness of the battery cell was 11 mm. The first-bent electrode tab was bent to clad the remaining electrode tabs to form the bending portion. The bending portion was connected to external electrode tabs by soldering. The battery cell was further filled with electrolyte, then encapsulated and formatted to obtain the lithium battery.

Embodiment 2

Positive electrode plate and negative electrode plate preparation: each first electrode tab was rectangular. The width of the first electrode tab was 32 mm, and the height of the first electrode tab was 20 mm. The second electrode was rectangular, the width of the second electrode was 66 mm, and the height of the second electrode was 17 mm. Polygonal transitions were provided at the corners of the receiving groove and the junction of the second electrode tab and the connecting area. Other steps were the same as those of EMBODIMENT 1.

Lithium battery preparation: the same as that of EMBODIMENT 1.

Embodiment 3

Positive electrode plate and negative electrode plate preparation: each first electrode tab was rectangular. The width of the first electrode tab was 32 mm, and the height of the first electrode tab was 20 mm. The second electrode was rectangular, the width of the second electrode was 66 mm, and the height of the second electrode was 17 mm. Other steps were the same as those of EMBODIMENT 1.

Lithium battery preparation: the same as that of EMBODIMENT 1.

Embodiment 4

Positive electrode plate and negative electrode plate preparation: the same as that of EMBODIMENT 1.

Lithium battery preparation: The second electrode tab, which functioned as the first-bent electrode tab, was bent to clad the first electrode tabs to form a bending portion. Other steps were the same as those of EMBODIMENT 1.

Embodiment 5

Positive electrode plate and negative electrode plate preparation: the same as that of EMBODIMENT 1.

Lithium battery preparation: The second electrode tab, which functioned as the last-bent electrode tab, was bent to clad the first electrode tabs to form a bending portion. Other steps were the same as those of EMBODIMENT 1.

Embodiment 6

Positive electrode plate and negative electrode plate preparation: the second electrode tab was omitted from the electrode plate. Other steps were the same as those of EMBODIMENT 1.

Lithium battery preparation: the positive electrode plate, a separator (the separator having a blocking area), and the negative electrode plate were wound in place to form a battery cell. The thickness of the battery cell was 11 mm. The first electrode tabs were directly bent form the bending portion. The bending portion was connected to external electrode tabs by soldering. The battery cell was further filled with electrolyte, then encapsulated and formatted to obtain the lithium battery.

Comparative Embodiment 1

Positive electrode plate and negative electrode plate preparation: the receiving grooves and the second electrode tab were omitted from the electrode plate. Other steps were the same as those of EMBODIMENT 1.

Lithium battery preparation: the positive electrode plate, a separator, and the negative electrode plate were wound to form a battery cell. The thickness of the battery cell was 11 mm. The first electrode tabs were directly bent form the bending portion. The bending portion was connected to external electrode tabs by soldering. The battery cell was further filled with electrolyte, then encapsulated and formatted to obtain the lithium battery.

Comparative Embodiment 2

Positive electrode plate and negative electrode plate preparation: the same as that of COMPARATIVE EMBODIMENT 1.

Lithium battery preparation: the positive electrode plate, a separator, and the negative electrode plate were wound to form a battery cell. The thickness of the battery cell was 11 mm. The first electrode tabs were directly bent to form a bending portion. The bending portion was connected to external electrode tabs by soldering. Adhesive was applied to the bending portion, the portion of the electrode plates facing the bending portion, and the first-bent electrode tab, to avoid short circuit. The battery cell was further filled with electrolyte, then encapsulated and formatted to obtain the lithium battery.

Comparative Embodiment 3

Positive electrode plate and negative electrode plate preparation: the receiving grooves were omitted from the electrode plate. Other steps were the same as those of EMBODIMENT 1.

Lithium battery preparation: the second electrode tab, which functioned as the first-bent electrode tab, was bent to clad the first electrode tabs to form the bending portion. Other steps were the same as those of EMBODIMENT 1.

Each lithium battery made in embodiments 1-6 and comparative embodiments 1-3 was tested. The testing was by being dropped, undergoing external vibrations, and being subjected to high temperature and humidity. Each lithium battery was tested ten times for each type of test. The results are shown in Table 1.

TABLE 1

| Lithium battery | Receiving groove included? | Second electrode tab included? | Dropped | Vibrated | High temperature and humidity |
|---|---|---|---|---|---|
| Embodiment 1 | Y | Y | 10/10 Pass | 10/10 Pass | 10/10 Pass |
| Embodiment 2 | Y | Y | 10/10 Pass | 10/10 Pass | 10/10 Pass |
| Embodiment 3 | Y | Y | 10/10 Pass | 10/10 Pass | 10/10 Pass |
| Embodiment 4 | Y | Y | 10/10 Pass | 10/10 Pass | 10/10 Pass |
| Embodiment 5 | Y | Y | 10/10 Pass | 10/10 Pass | 10/10 Pass |
| Embodiment 6 | Y | N | 10/10 Pass | 10/10 Pass | 10/10 Pass |
| Comparative embodiment 1 | N | N | 3/10 Pass | 4/10 Pass | 6/10 Pass |
| Comparative embodiment 2 | N | N | 8/10 Pass | 7/10 Pass | 8/10 Pass |
| Comparative embodiment 3 | N | Y | 3/10 Pass | 4/10 Pass | 10/10 Pass |

Table 1 shows no short circuits occurring in the batteries prepared by EMBODIMENTs 1-6. In comparison, the batteries prepared by COMPARATIVE EMBODIMENTs 1-3 did have short circuits.

By defining the receiving groove at the electrode plate, the bending portion cannot get into contact with the electrode plate even when the bending portion moves. Thus, short circuits can be avoided, which improves the safety of the battery.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A battery comprising:
   a battery cell comprising a first electrode plate and a second electrode plate; and
   a first set of electrode tabs electrically connected to the first electrode plate, the first set of electrode tabs comprising a first bending portion, an edge of the second electrode plate defining a first receiving groove, and the first receiving groove corresponding to the first bending portion, wherein the first electrode plate defines a second receiving groove, and the second receiving groove corresponds to the first bending portion, and wherein the first electrode plate and the second electrode plate are wound to form the battery cell, and the battery cell comprises a first cell portion and a second cell portion facing the first cell portion, the first set of electrode tabs is disposed at the first cell portion, and the first receiving groove and the second receiving groove face each other, and are disposed at the second cell portion.

2. The battery of claim 1, wherein the first set of electrode tabs comprises a plurality of first electrode tabs and at least one second electrode tab, the plurality of first electrode tabs overlap each other in the battery cell, a width of the second electrode tab is greater than a width of each of the plurality of first electrode tabs, and the second electrode tab is disposed at an inner side and/or an outer side of the battery cell.

3. The battery of claim 2, wherein a connecting area is disposed between the second electrode tab and the first electrode plate, and a polygonal transition is provided at a junction of the connecting area and the first electrode plate.

4. The battery of claim 2, wherein the plurality of first electrode tabs and the second electrode tab are integrally formed with the first electrode plate.

5. The battery of claim 1, wherein the battery cell further comprises an isolation film disposed between the first electrode plate and the second electrode plate, and the isolation film comprises a blocking area, and the blocking area is disposed at an edge of the isolation film, and corresponds to the first receiving groove and the second receiving groove.

6. The battery of claim 1, wherein a width of each of the first receiving groove and the second receiving groove is greater than a maximum width of the first bending portion.

7. The battery of claim 1, wherein a depth of each of the first receiving groove and the second receiving groove is greater than a total length of the first bending portion.

8. The battery of claim 1, further comprising a second set of electrode tabs electrically connected to the second electrode plate, wherein the second set of electrode tabs comprises a second bending portion, and the first electrode plate further defines a third receiving groove, and the third receiving groove corresponds to the second bending portion.

9. The battery of claim 8, wherein the second electrode plate further defines a fourth receiving groove, and the fourth receiving groove corresponds to the second bending portion.

10. The battery of claim 9, wherein the second electrode plate further defines a fifth receiving groove, and the first electrode plate further defines a sixth receiving groove, and the fifth receiving groove and the sixth receiving groove correspond to the first bending portion.

11. The battery of claim 10, wherein the first electrode plate further defines a seventh receiving groove, and the second electrode plate further defines an eighth receiving groove, and the seventh receiving groove and the eighth receiving groove correspond to the second bending portion.

12. The battery of claim 8, wherein the second set of electrode tabs comprises a plurality of first electrode tabs and at least one second electrode tab, the plurality of first electrode tabs overlap each other in the battery cell, a width of the second electrode tab is greater than a width of each of the plurality of first electrode tabs, and the second electrode tab is disposed at an inner side and/or an outer side of the battery cell.

13. The battery of claim 12, wherein a connecting area is disposed between the second electrode tab and the first electrode plate, and a polygonal transition is provided at a junction of the connecting area and the first electrode plate.

14. The battery of claim 8, wherein the plurality of first electrode tabs and second electrode tab are integrally formed with the second electrode plate.

15. The battery of claim 8, wherein the second bending portion is U-shaped.

16. The battery of claim 1, wherein a depth of each of the first receiving groove and the second receiving groove is greater than a total length of the first bending portion.

17. The battery of claim 1, wherein an arc is provided at each corner of the first receiving groove and the second receiving groove.

18. The battery of claim 1, wherein the first bending is U-shaped.

* * * * *